US 9,354,420 B2

(12) United States Patent
Takehana

(10) Patent No.: US 9,354,420 B2
(45) Date of Patent: May 31, 2016

(54) LENS BARREL AND PROJECTOR

(71) Applicant: Seiko Epson Corporation, Tokyo (JP)

(72) Inventor: Naoto Takehana, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 144 days.

(21) Appl. No.: 14/261,859

(22) Filed: Apr. 25, 2014

(65) Prior Publication Data

US 2014/0333907 A1    Nov. 13, 2014

(30) Foreign Application Priority Data

May 9, 2013 (JP) .................................. 2013-099072

(51) Int. Cl.
| G02B 7/04 | (2006.01) |
| G03B 21/14 | (2006.01) |
| G02B 7/10 | (2006.01) |
| G02B 27/14 | (2006.01) |
| G03B 21/53 | (2006.01) |

(52) U.S. Cl.
CPC .. *G02B 7/04* (2013.01); *G02B 7/10* (2013.01); *G02B 27/141* (2013.01); *G03B 21/142* (2013.01); *G03B 21/145* (2013.01); *G03B 21/53* (2013.01)

(58) Field of Classification Search
CPC .... G03B 21/53; G03B 21/142; G03B 21/145; G02B 15/14; G02B 7/022
See application file for complete search history.

(56) References Cited

U.S. PATENT DOCUMENTS

| 2004/0207931 | A1* | 10/2004 | Lee ........................ G02B 7/102 359/704 |
| 2007/0115566 | A1* | 5/2007 | Miyazawa ............... G02B 7/02 359/811 |
| 2007/0171546 | A1* | 7/2007 | Todani ................... G02B 15/14 359/700 |
| 2008/0094730 | A1* | 4/2008 | Toma ..................... G02B 7/022 359/703 |
| 2010/0188643 | A1* | 7/2010 | Makino ................ G03B 21/145 353/88 |
| 2013/0342818 | A1* | 12/2013 | Shen ...................... G02B 7/021 353/100 |

FOREIGN PATENT DOCUMENTS

| JP | 2002-55268 A | 2/2002 |
| JP | 2004-347646 A | 12/2004 |

* cited by examiner

*Primary Examiner* — Sultan Chowdhury
(74) *Attorney, Agent, or Firm* — ALG Intellectual Property, LLC

(57) ABSTRACT

A projection lens includes lens frames each of which holds a lens group and has cam pins, a guide barrel which has linear grooves through which the cam pins are inserted and into which the lens frames are sequentially fit and inserted, and a cam barrel into which the guide barrel is fit and inserted, which has cam grooves with which the cam pins protruding through the linear grooves engage, and which is rotated relative to the guide barrel to guide the cam pins along the linear grooves and the cam grooves and hence move the lens frames along the linear grooves. A protrusion is provided on the inner surface of the guide barrel, and the protrusion comes into contact with one of the lens frames so that the cam pins of the lens frame are positioned at the ends of the corresponding cam grooves.

10 Claims, 7 Drawing Sheets

LENS BARREL AND PROJECTOR

BACKGROUND

1. Technical Field

The present invention relates to a lens barrel and a projector.

2. Related Art

There is a known projector of related art that modulates light emitted from a light source in accordance with image information and projects the modulated light through a projection lens in the form of a lens barrel. The projection lens has a plurality of lens groups, and some of the lens groups are configured to be movable along the optical axis of the projection lens (see JP-A-2002-55268, for example). The projection lens is configured to change the magnification of a projected image by moving the movable lens groups.

The projection lens described in JP-A-2002-55268 includes a plurality of lens frames that hold the plurality of lens groups and have each cam pins extending outward, a cylindrical guide barrel into which the plurality of lens frames are fit and inserted, and a cylindrical cam barrel into which the guide barrel is fit and inserted. The guide barrel has open guide grooves formed along the optical axis, and the cam barrel has a plurality of cam grooves formed therein and each of the cam grooves defines movement of the corresponding lens frame. The plurality of lens frames, the cam pins of which engage with the guide grooves and the cam grooves, move along the optical axis when the cam barrel is rotated.

A method for manufacturing the projection lens described in JP-A-2002-55268 includes stacking the lens frames, supporting the stacked lens frames with a U-shaped jig (holding pin), and inserting the supported lens frames into the guide barrel all together. To carry out the manufacturing method described above, the thickness of each of the lens frames is so set that the distances between the stacked lens frames match with the distances between the cam grooves, and a hole and a groove for the supporting holding pin are provided in the outer circumferential surface of each of the lens frames.

Further, JP-A-2002-55268 discloses another technology for manufacturing the projection lens by using a holding pin provided with engaging protrusions. In the technology is characterized in that the engaging protrusions provided on the holding pin have protruding lengths different from each other in correspondence with the lens frames, and that the distances between the lens frames match with the distances between the cam grooves when the lens frames come into contact with the respective engaging protrusions.

The technology described in JP-A-2002-55268, however, has a problem of an increase in the thickness of each of the lens frames and an increase in the size of each of the lens frames in the radial direction not only because the thickness of each of the lens frames is so set that the distances between the stacked lens frames match with the distances between the cam grooves but also because each of the lens frames has a hole and a groove for the supporting holding pin. Further, a die used to manufacture each of the lens frames may undesirably have a complicated shape and a low-strength portion due to the increase in the thickness of each of the lens frames and the hole and the groove provided therein.

Further, the technology for providing the holding pin with the engaging protrusions described in JP-A-2002-55268 also has the problem of an increase in the size of each of the lens frames in the radial direction although the increase in the thickness of each of the lens frames is suppressed. As a result, each of the guide barrel and the cam barrel has an enlarged exterior shape, undesirably resulting in an increase in the size of the projection lens and an increase in the weight thereof.

SUMMARY

An advantage of some aspects of the invention is to solve at least a part of the problems described above, and the invention can be implemented in the form of the following aspects or application examples.

Application Example 1

A lens barrel according to this application example includes a plurality of lens groups, a plurality of lens frames that hold the respective plurality of lens groups and each have a cam pin that protrudes in a direction perpendicular to an optical axis of the plurality of lens groups, a guide barrel that has a first opening, a second opening, and a linear groove which extends along the optical axis and through which the cam pins are inserted, the plurality of lens frames sequentially fit and inserted into the guide barrel through the first opening, and a cam barrel into which the guide barrel is fit and inserted and which has cam grooves with which the cam pins protruding through the linear groove engage, the linear groove and the cam grooves guiding the cam pins when the cam barrel is rotated around the optical axis relative to the guide barrel to move the plurality of lens groups along the linear groove, and a protrusion is provided on an inner surface of the guide barrel, the protrusion coming into contact with at least one of the plurality of lens frames and restricting movement of the lens frame toward the second opening so that the cam pin of the lens frame is positioned at an end of the corresponding cam groove.

According to the configuration described above, the lens frames that hold the lenses are fit and inserted into the guide barrel, and the guide barrel is fit and inserted into the cam barrel. A protrusion is provided on the inner surface of the guide barrel, and the protrusion comes into contact with at least one of the lens frames so that the cam pin of the lens frame is positioned at the end of the corresponding cam groove. In this configuration, after the lens frame is moved until it comes into contact with the protrusion, rotating the cam barrel readily allows the cam pin to engage with the cam groove.

The cam pin can therefore be positioned at the end of the cam groove without setting the thickness of the lens frame in such a way that the cam pin is positioned at the end of the cam groove when the plurality of lens frames are stacked on each other or without supporting the plurality of lens frames with a jig, whereby a lens barrel that is readily manufactured with reduction in the size and weight of the lens frame can be provided. That is, in a configuration in which a plurality of lens frames are stacked on each other, each of the lens frames has a large thickness in the direction in which the lens frames are stacked on each other (direction along optical axis), whereas in a configuration in which a jig is used to support the lens frames, each of the lens frames requires a portion to be supported. In both cases, the thickness of each of the lens frames in the direction perpendicular to the optical axis increases. According to the configuration in the present application example, the cam pin of at least one of the lens frames can be positioned at the end of the corresponding cam groove without increasing the thickness of the lens frame in the direction along the optical axis or in the direction perpendicular to the optical axis. The lens barrel can therefore be readily manufactured with reduction in the size and weight of at least one lens frame and hence the size and weight of the lens barrel. Further, since it is unnecessary to add a shape that allows the plurality of lens frames to be stacked on each other or a shape that is supported by a jig to the lens frames, whereby the shape of each of the lens frames can be simplified and the structure and shape of a die used to manufacture each of the lens frames can be simplified.

Application Example 2

In the lens barrel according to the application example described above, it is preferable that the lens frame disposed in a position closer to the second opening than the lens frame that comes into contact with the protrusion has a cutout that prevents the protrusion from obstructing the lens frame disposed in the position closer to the second opening.

According to the configuration described above, since the lens frame that is disposed in a position closer to the second opening than the lens frame the movement of which is restricted by the protrusion has the cutout described above, the lens frame that is disposed in the position closer to the second opening can be located in a predetermined position in the guide barrel, in which the protrusion is formed, without coming into contact with the protrusion.

Application Example 3

In the lens barrel according to the application example described above, it is preferable that each of the cam grooves has a first end located on the side where the first opening is present and a second end located on the side where the second opening is present, and that when the lens frame that is intended to come into contact with the protrusion comes into contact with the protrusion, the cam pin of the lens frame is positioned at the second end.

According to the configuration described above, the lens frame that is inserted into the guide barrel through the first opening comes into contact with the protrusion, and the cam pin of the lens frame is therefore positioned at the second-opening-side second end of the corresponding cam groove. The lens frame is then moved when the cam pin is guided from the second end of the cam groove toward the first end thereof. That is, the lens frame that is in contact with the protrusion is moved along the optical axis in the direction away from the protrusion.

As compared with a configuration in which the lens frame inserted into the guide barrel through the first opening comes into contact with the protrusion so that the cam pin of the lens frame is positioned at the first end of the corresponding cam groove, the configuration of the present application example can simplify the shapes of the lens frame and the protrusion. That is, in the configuration in which the lens frame comes into contact the protrusion so that the cam pin is positioned at the first end of the cam groove, in order to move the lens frame from the first end to the second end, the lens frame and the protrusion need to be so configured that the lens frame is movable to the opposite side of the protrusion, which complicates the structure of the lens barrel and the shape of each of the lens frame and the protrusion.

On the other hand, the configuration according to the present application example requires no structure that allows the lens frame to move to the opposite side of the protrusion, whereby not only can the structure of the lens barrel and the shape of each of the lens frame and the guide barrel be simplified but also the structure and shape of a die used to manufacture each of the members described above can be simplified.

Application Example 4

In the lens barrel according to the application example described above, it is preferable that among the plurality of lens frames, a last lens frame that is fit and inserted into the guide barrel after the other lens frames have an engaging portion that protrudes by an amount smaller than the amount of protrusion of the cam pin, that in the inner surface of the guide barrel is formed a stepped portion that engages with the engaging portion of the last lens frame fit and inserted through the first opening to restrict movement of the last lens frame toward the second opening, and that the stepped portion and the engaging portion are so formed that the cam pin of the last lens frame is positioned at an end of the corresponding cam groove.

According to the configuration described above, the last lens frame has the engaging portion, and the guide barrel has the stepped portion provided in an edge portion thereof facing the first opening. In this case, the stepped portion formed in the guide barrel still ensures the strength of the guide barrel, and the cam pin of the last lens frame can be positioned at the end of the corresponding cam groove without providing the guide barrel with a protrusion that restricts the movement of the last lens frame or increasing the thickness of the last lens frame along the optical axis or the thickness thereof in the direction perpendicular to the optical axis.

Application Example 5

In the lens barrel according to the application example described above, it is preferable that the lens barrel further includes a focus barrel rotatably supported at the first opening of the guide barrel, a focus lens group held by the focus barrel, a fixed frame fixed at the second opening of the guide barrel, and a fixed lens group held by the fixed frame.

According to the configuration described above, the lens barrel includes not only the plurality of lens groups, which are movable along the optical axis, but also the focus lens group and the fixed lens group. The lens barrel can therefore not only be compact and lightweight but also perform aberration compensation, zoom adjustment, focus adjustment, and other functions.

Application Example 6

A projector according to this application example includes a light source, a light modulator that modulates light emitted from the light source in accordance with image information, and any of the lens barrels described above that project the light modulated by the light modulator.

Since the projector includes one of the lens barrels described above, the projector can be not only compact and lightweight but also capable of projection of an image of satisfactory image quality and zoom and focus adjustment of the projected image.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a screen or any other projection surface.

Primary Configuration of Projector

Figure 1:
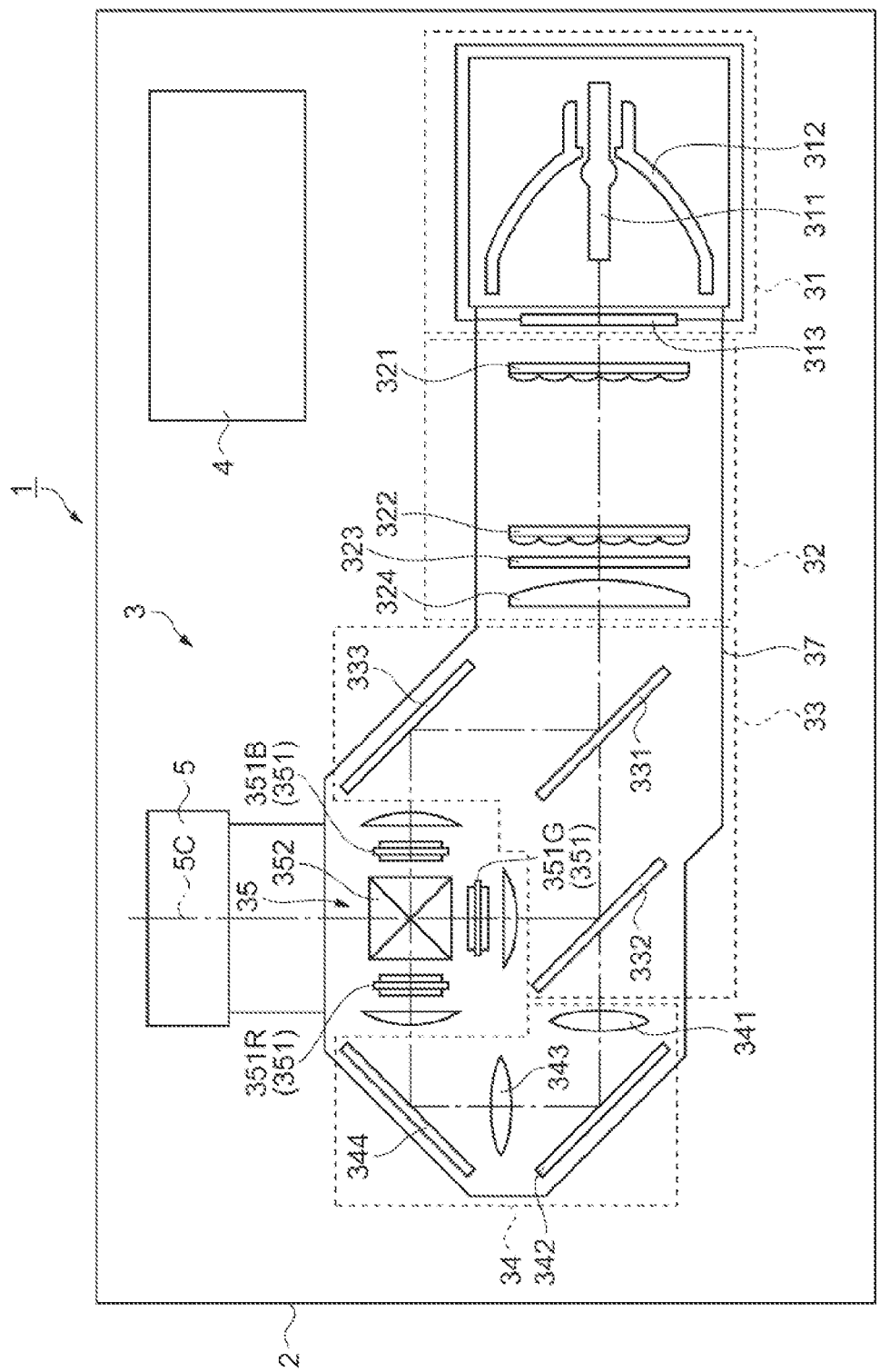
FIG. 1 is a diagrammatic view showing a schematic configuration of a projector according to an embodiment of the invention.

FIG. 1 is a diagrammatic view showing a schematic configuration of a projector 1 according to the present embodiment.

The projector 1 includes an exterior enclosure 2, which forms the exterior of the projector, a controller (not shown), an optical unit 3, which has a light source apparatus 31, and a power source apparatus 4, as shown in FIG. 1. Although not shown, the exterior enclosure 2 further accommodates a cooling apparatus that cools the optical unit 3, the power source apparatus 4, and other components.

The exterior enclosure 2 is formed of a plurality of members, which are not described in detail, and is provided, for example, with an intake port through which outside air is introduced and an exhaust port through which air heated in the exterior enclosure 2 is exhausted.

The controller includes a CPU (central processing unit), a ROM (read only memory), a RAM (random access memory), and other components, functions as a computer, and controls the action of the projector 1, for example, controls image projection.

The optical unit 3 optically processes light outputted from the light source apparatus 31 and projects the processed light under the control of the controller.

The optical unit 3 includes not only the light source apparatus 31 but also an optical integration illumination system 32, a color separation system 33, a relay system 34, an optical apparatus 35, a projection lens 5 in the form of a lens barrel, and an optical part enclosure 37, in which the optical parts described above are disposed in predetermined positions along the optical path, as shown in FIG. 1.

The light source apparatus 31 includes a discharge-type light source 311, which is formed, for example, of an ultra-high-pressure mercury lamp or a metal halide lamp, a reflector 312, and a parallelizing lens 313. In the light source apparatus 31, light emitted from the light source 311 is reflected off the reflector 312, and the parallelizing lens 313 then aligns traveling directions of light fluxes that form the reflected light and directs the resultant light toward the optical integration illumination system 32.

The optical integration illumination system 32 includes a first lens array 321, a second lens array 322, a polarization conversion element 323, and a superimposing lens 324. The first lens array 321 and the second lens array 322 along with the superimposing lens 324 substantially superimpose the light fluxes outputted from the light source apparatus 31 on the surface of each liquid crystal panel that will be described later. The polarization conversion element 323 has a function of aligning the polarization directions of randomly polarized light fluxes outputted from the second lens array 322 with each other to form substantially one type of polarized light that each liquid crystal panel can use.

The color separation system 33 includes two dichroic mirrors 331 and 332 and a reflection mirror 333 and has a function of separating the light outputted from the optical integration illumination system 32 into the following three color light fluxes: red light (hereinafter referred to as "R light"), green light (hereinafter referred to as "G light"), and blue light (hereinafter referred to as "B light").

The relay system 34 includes a light-incident-side lens 341, a relay lens 343, and reflection mirrors 342 and 344 and has a function of guiding the separated R light from the color separation system 33 to a liquid crystal panel for R light. In the optical unit 3, the relay system 34 guides the R light in the present embodiment, but the relay system 34 does not necessarily guide the R light but may instead guide the B light.

The optical apparatus 35 includes light modulators 351 provided for the color light fluxes (reference character 351R denotes light modulator for R light, reference character 351G denotes light modulator for G light, and reference character 351B denotes light modulator for B light) and a cross dichroic prism 352 as a light combining system.

Each of the light modulators 351 includes a transmissive liquid crystal panel, a light-incident-side polarizer disposed on the light incident side of the liquid crystal panel, and a light-exiting-side polarizer disposed on the light exiting side of the liquid crystal panel and modulates the corresponding color light flux in accordance with image information.

The cross dichroic prism 352 is formed by bonding four rectangular prisms and hence has a substantially square shape in a plan view, and two dielectric multilayer films are formed on the interfaces between the bonded rectangular prisms. The cross dichroic prism 352, in which the dielectric multilayer films reflect the R light and the B light modulated by the light modulators 351R and 351B and transmit the G light modulated by the light modulator 351G, combines the three modulated color light fluxes with one another.

The projection lens 5 includes a plurality of lens groups each of which is formed of one or more lenses, and the lens groups are disposed along an optical axis 5C. The projection lens 5 has a function of zoom adjustment and focus adjustment and enlarges and projects the combined light from the cross dichroic prism 352 on a screen.

Configuration Projection Lens

The projection lens 5 will now be described in detail. In the following description, the side of the projection lens 5 on which the combined light from the cross dichroic prism 352 is incident is called a downstream side, and the side of the projection lens 5 out of which the light exits is called an upstream side for ease of description.

Figure 2:
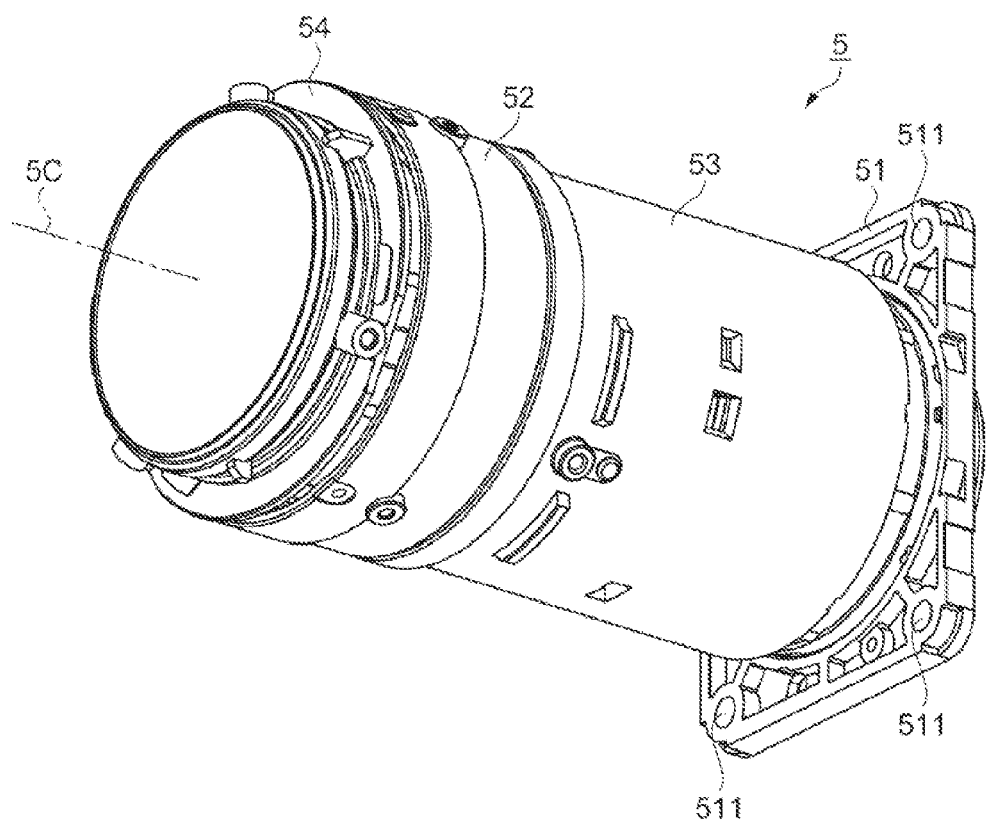
FIG. 2 is a perspective view of a projection lens in the embodiment.
Figure 3:
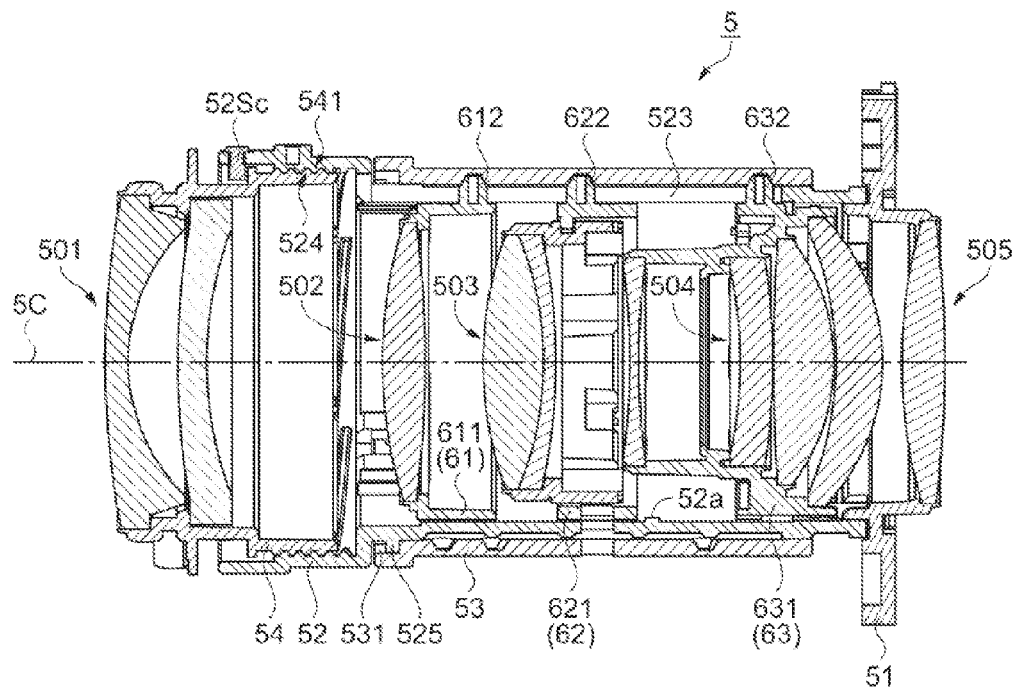
FIG. 3 is a cross-sectional view of the projection lens in the embodiment.
Figure 4:
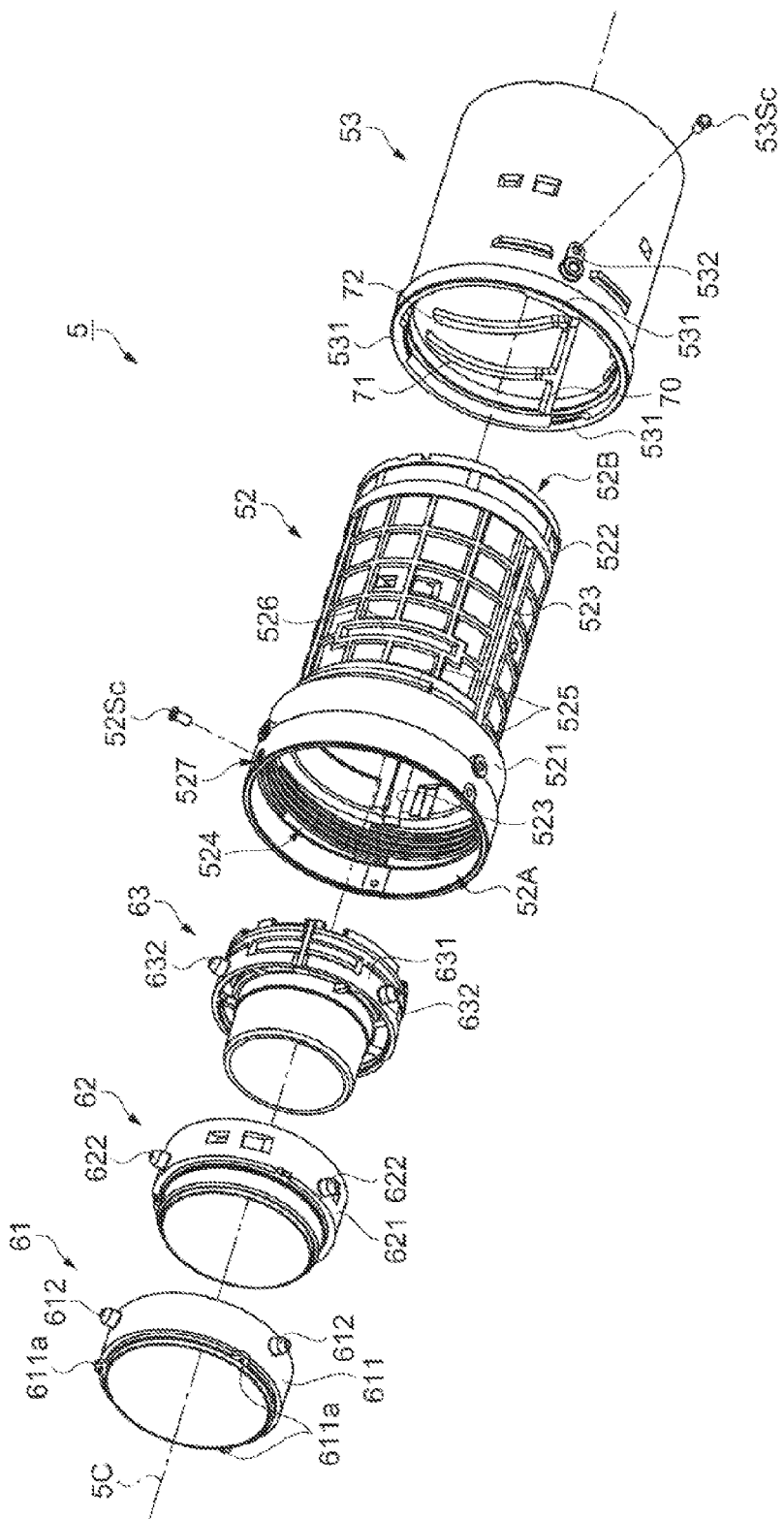
FIG. 4 is an exploded perspective view of the projection lens in the embodiment.

FIG. 2 is a perspective view of the projection lens 5. FIG. 3 is a cross-sectional view of the projection lens 5. FIG. 4 is an exploded perspective view of the projection lens 5.

The projection lens 5 includes a fixed frame 51, a first lens group 501 to a fifth lens group 505 sequentially disposed along the optical axis 5C from the upstream side, lens frames 61, 62, and 63, a guide barrel 52, a cam barrel 53, and a focus barrel 54, as shown in FIGS. 2 to 4. In FIG. 4, the fixed frame 51 and the focus barrel 54 are omitted.

The fixed frame 51 is a member that supports the guide barrel 52. The fixed frame 51 has a rectangular shape in a plan view and has a central portion to which the fifth lens group 505 as a fixed lens group is fixed (see FIG. 3) and four corners where circular holes 511, through which screws are inserted, are formed, as shown in FIG. 2. The projection lens 5 is fixed to the optical part enclosure 37 with screws inserted through the circular holes 511.

The lens frames 61, 62, and 63 are so formed that they hold the second lens group 502, the third lens group 503, and the fourth lens group 504, respectively, and can move in the guide barrel 52 along the optical axis 5C, as shown in FIG. 3.

The lens frame 61 has a holding portion 611, which holds the second lens group 502, and cam pins 612, as shown in FIGS. 3 and 4.

The holding portion 611 has a tubular shape that covers the outer circumference of the second lens group 502, and the holding portion 611 is fit and inserted into the guide barrel 52. The holding portion 611 has engaging portions 611a provided thereon, and each of the engaging portions 611a protrudes from the tubular outer circumferential surface of the holding portion 611 by an amount smaller than the cam pins 612, as shown in FIG. 4. The engaging portions 611a are disposed on the upstream side of the outer circumferential surface of the holding portion 611 at three locations in the circumferential direction around the optical axis 5C at equal angular intervals of 120°, and each of the engaging portions can engage with a stepped portion 52b (see FIG. 6A), which will be described later, of the guide barrel 52.

The cam pins 612 are disposed in an area downstream of the engaging portions 611a, protrude from the outer circumferential surface of the holding portion 611 in directions perpendicular to the optical axis 5C, and are disposed at three locations in the circumferential direction around the optical axis 5C at equal angular intervals of 120°, as shown in FIG. 4. The three cam pins 612 have the same cylindrical shape of the same size and each have a tapered front end portion.

Each of the cam pins 612 is inserted through a linear groove 523, which will be described later, of the guide barrel 52 when the holding portion 611 is fit and inserted into the guide barrel 52, and the length of the cam pins 612 is so set that the front ends thereof protrude through the linear grooves 523, as shown in FIG. 3.

The lens frame 62 has a tubular holding portion 621, which holds the third lens group 503, and three cam pins 622, as the lens frame 61 does.

Figure 5A:
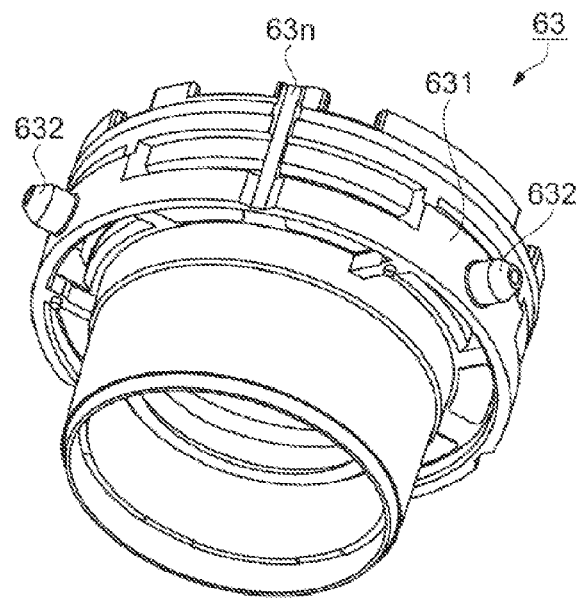
FIGS. 5A and 5B show a lens frame in the embodiment.
Figure 5B:
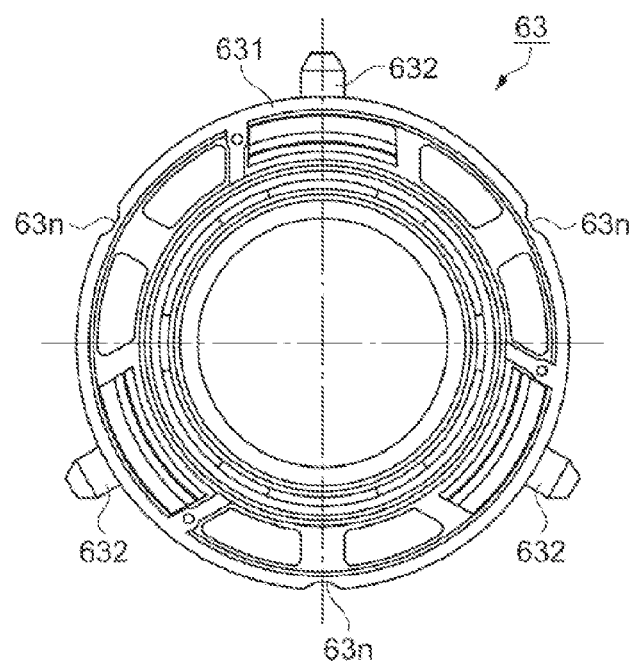

FIGS. 5A and 5B show the lens frame 63. FIG. 5A is a perspective view, and FIG. 5B is a plan view.

The lens frame 63 has a tubular holding portion 631, which holds the fourth lens group 504, and three cam pins 632, as the lens frame 61 does, as shown in FIGS. 3, 5A, and 5B.

Each of the holding portions 621 and 631 has an outer diameter equal to the outer diameter of the holding portion 611 of the lens frame 61, and the cam pins 622 and 623 have the same shape as that of the cam pins 612.

The holding portion 631 of the lens frame 63 has cutouts 63n formed in the outer circumferential surface thereof, as shown in FIGS. 5A and 5B.

The cutouts 63n are disposed at three locations in the circumferential direction around the optical axis 5C at equal angular intervals of 120°, and the three cutouts 63n are formed in correspondence with protrusions 52a (see FIGS. 6A and 6B), which will be described later, of the guide barrel 52. Specifically, the cutouts 63n are so formed that the protrusions 52a do not obstruct the lens frame 63 when the lens frame 63 is fit and inserted into the guide barrel 52.

The guide barrel 52 is made of a synthetic resin, such as PC (polycarbonate) containing glass fibers, and disposed in a position upstream of the fixed frame 51, as shown in FIG. 3.

Figure 6A:
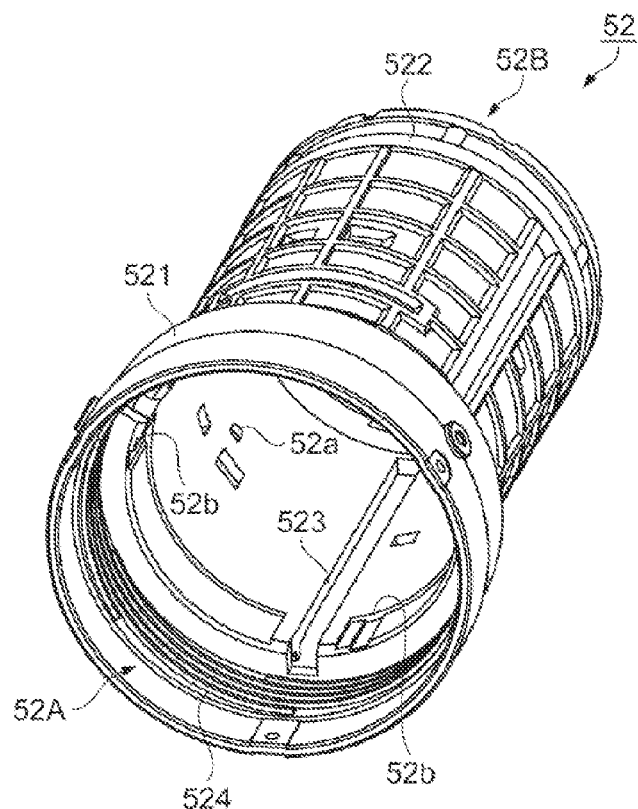
FIGS. 6A and 6B show a guide barrel in the embodiment.
Figure 6B:
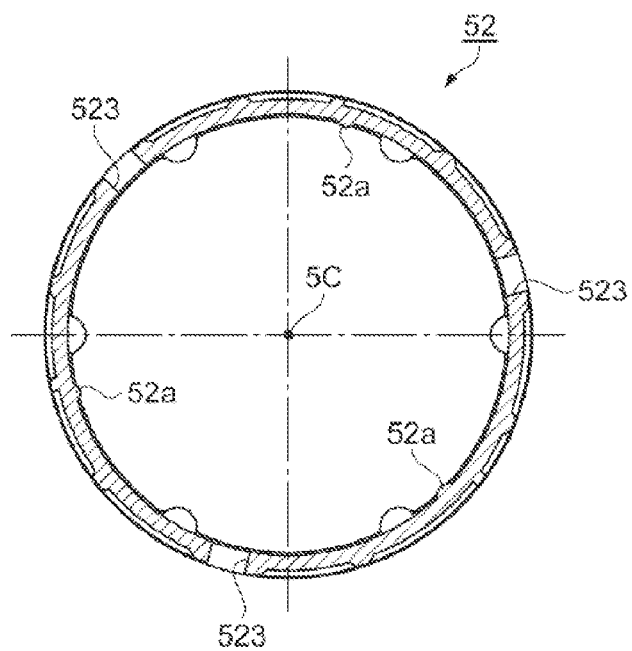

FIGS. 6A and 6B show the guide barrel 52. FIG. 6A is a perspective view, and FIG. 6B is a cross-sectional view.

The guide barrel 52 has a tubular shape formed of a large cylindrical portion 521 having a tubular shape and disposed in an upstream position and a small cylindrical portion 522 having a tubular shape having a diameter smaller than the diameter of the large cylindrical portion 521, with an end of the large cylindrical portion 521 and an end of the small cylindrical portion 522 bonded to each other, as shown in FIGS. 4, 6A, and 6B. The large cylindrical portion 521 has an upstream-side opening 52A, and the small cylindrical portion 522 has a downstream-side opening 52B. The upstream-side opening 52A corresponds to a first opening, and the downstream-side opening 52B corresponds to a second opening. The guide barrel 52 is not necessarily made of a synthetic resin and may be made of a metal, such as aluminum.

The large cylindrical portion 521 has an inner diameter set to be greater than the outer diameter of each of the lens frames 61, 62, and 63. The small cylindrical portion 522, into which the holding portions 611, 621, and 631 are fit and inserted, has an inner diameter set at a size that allows the holding portions 611, 621, and 631 to smoothly move along the optical axis 5C.

Linear grooves 523 are formed in the guide barrel 52, and each of the linear grooves 523 is a cutout portion extending along the optical axis 5C toward the downstream side from a stepped portion formed between the large cylindrical portion 521 and the small cylindrical portion 522, as shown in FIGS. 6A and 6B. The linear grooves 523 are disposed at three locations in the circumferential direction around the optical axis 5C at equal angular intervals of 120° so that the cam pins 612, 622, and 632 are inserted through the linear grooves 523.

The linear grooves 523 engage with the cam pins 612, 622, and 632 in such a way that each of the grooves sandwiches the corresponding cam pin when the lens frames 61, 62, and 63 are fit and inserted into the guide barrel 52. The linear grooves 523 then guide the lens frames 61, 62, and 63 along the optical axis 5C but prevent them from rotating around the optical axis 5C in the circumferential direction.

After the lens frames 61, 62, and 63 are inserted into the large cylindrical portion 521 through the upstream-side opening 52A sequentially in the order of the lens frames 63, 62, and 61, the cam pins 632, 622, and 612 are inserted through the linear grooves 523, and the holding portions 631, 621, and 611 are fit and inserted into the small cylindrical portion 522. Among the lens frames 61, 62, and 63 fit and inserted into the guide barrel 52, the lens frame 61 corresponds to the last lens frame fit and inserted into the guide barrel 52 after the other two.

The small cylindrical portion 522 is a portion that is fit and inserted into the cam barrel 53. The inner surface of the cam barrel 53 has cam grooves 71, 72, and 73 formed therein, and the cam pins 612, 622, and 632 that protrude through the linear grooves 523 engage with the cam groove 71, 72, and 73, respectively, which will be described later in detail. When the cam barrel 53 is rotated relative to the guide barrel 52, the cam pins 612, 622, and 632 are guided through the linear grooves 523 and the cam grooves 71, 72, and 73, whereby the lens frames 61, 62, and 63 move along the optical axis 5C.

The inner surface of the small cylindrical portion 522 has protrusions 52a provided thereon, as shown in FIGS. 3, 6A, and 6B, and the protrusions 52a restrict downstream movement of the lens frame 62 (movement toward downstream-side opening 52B).

The protrusions 52a have a size that allows contact with the downstream-side end surface of the holding portion 621 and are disposed at three locations in the circumferential direction around the optical axis 5C at equal angular intervals of 120°. The protrusions 52a are so set that when the holding portion 621 comes into contact with the protrusions 52a, the lens frame 62 is positioned in a predetermined position in the guide barrel 52, and the cam pins 622 are located at the ends of the cam grooves 72 of the cam barrel 53 that correspond to the cam pins 622.

Since the lens frame 63, which is inserted into the guide barrel 52 before the lens frame 62, that is, the lens frame 63 disposed closer to the downstream-side opening 52B than the lens frame 62, which comes into contact with the protrusion 52a, has the cutouts 63n as described above, the lens frame 63 does not come into contact with the protrusions 52a but is fit and inserted into the small cylindrical portion 522 to a position downstream of the protrusions 52a.

Further, the inner surface of an upstream-side edge portion of the small cylindrical portion 522 has stepped portions 52b, which are recessed from the inner surface, as shown in FIG. 6A.

The stepped portions 52b are disposed at three locations in the circumferential direction around the optical axis 5C at equal angular intervals of 120° in correspondence with the engaging portions 611a of the lens frame 61 fit and inserted into the guide barrel 52.

The stepped portions 52b, with which the engaging portions 611a of the lens frame 61 engage, restrict downstream movement of the lens frame 61 (movement toward downstream-side opening 52B). The stepped portions 52b are so set that when the engaging portions 611a come into contact with the stepped portions 52b, the lens frame 61 is positioned in a predetermined position in the guide barrel 52 and the cam pins 612 are located at the ends of the cam grooves 71 of the cam barrel 53 that correspond to the cam pins 612.

The outer circumferential surface of the small cylindrical portion 522 has locking portions 525 and a rotation restricting portion 526 formed therein, as shown in FIG. 4.

The locking portions 525 are protrusions that lock the cam barrel 53 along the optical axis 5C and formed in positions separate from the large cylindrical portion 521 and intermittent along the circumferential direction. The locking portions 525 are formed in positions between the linear grooves 523 but separate from the linear grooves 523.

The rotation restricting portion 526 is provided to define the range over which the cam barrel 53 rotates relative to the guide barrel 52. The rotation restricting portion 526 is provided in a position downstream of the locking portions 525, recessed over a predetermined range from the outer circumferential surface of the small cylindrical portion 522, and so formed that the rotation restricting portion 526 has a step on each side thereof in the circumferential direction.

The large cylindrical portion 521 has a threaded groove 524 formed in the inner circumferential surface thereof and a threaded hole 527 into which a stopper screw 52Sc is inserted through the outer surface, as shown in FIGS. 4, 6A, and 6B.

The downstream-side end surface of the small cylindrical portion 522, that is, the end surface thereof on the side where the downstream-side opening 52B is present has a positioning pin and a threaded hole (neither of them are not shown), and the guide barrel 52 is positioned by the positioning pin and fixed to the fixed frame 51 with a screw inserted through a through hole (not shown) provided through the fixed frame 51 and threaded into the threaded hole.

The focus barrel 54 has a cylindrical shape and holds the first lens group 501 as a focus lens group, as shown in FIG. 3. A threaded groove 541, which engages with the threaded groove 524 of the guide barrel 52, and rotation restricting portions (not shown) are formed along the outer circumferential surface of the focus barrel 54.

The rotation restricting portions are provided in the outer surface of the focus barrel 54 at two locations separated by a predetermined angle in the circumferential direction around the optical axis 5C.

The focus barrel 54, the threaded groove 541 of which engages with the threaded groove 524 of the guide barrel 52, is rotatably supported by the guide barrel 52.

The focus barrel 54, the rotation restricting portions of which come into contact with the stopper screw 52Sc, which is inserted into the threaded hole 527 and protrudes through the inner surface of the guide barrel 52, is rotated relative to the guide barrel 52 over a defined range. Further, the focus barrel 54, the rotatable range of which is defined, will not disengage from the guide barrel 52. A focus ring (not shown) is attached to the focus barrel 54. In the projection lens 5, rotating the focus ring moves the first lens group 501 along the optical axis 5C to bring a projected image into focus.

The cam barrel 53 will next be described in detail.

The cam barrel 53 is made of a synthetic resin, such as PC (polycarbonate) containing glass fibers, and has a tubular shape. The cam barrel 53, into which the small cylindrical portion 522 of the guide barrel 52 is fit and inserted, is so formed that the cam barrel 53 is rotatable relative to the guide barrel 52 around the optical axis 5C. The cam barrel 53 is not necessarily made of a synthetic resin and may be made of a metal, such as aluminum.

The cam barrel 53 is so formed that the outer circumferential surface of an upstream-side end portion protrudes outward, and upstream-side protruding portions 531, which protrude inward, are formed as part of the upstream-side end portion, as shown in FIG. 4.

The upstream-side protruding portions 531 are formed at locations in the circumferential direction around the optical axis 5C at equal angular intervals of 120° and are portions located between the large cylindrical portion 521 and the locking portions 525 of the guide barrel 52. Each of the upstream-side protruding portions 531 has a length in the circumferential direction set to be smaller than the distances between the locking portions 525 and a width so set that it is placed between the large cylindrical portion 521 and the locking portions 525.

After the small cylindrical portion 522 of the guide barrel 52 is fit and inserted into the cam barrel 53 and the cam barrel 53 is rotated to a predetermined position, the upstream-side protruding portions 531 are located between the large cylindrical portion 521 and the locking portions 525, whereby the cam barrel 53 is locked along the optical axis 5C by the guide barrel 52.

Further, the cam barrel 53 has a threaded hole 532 formed therein, and a stopper screw 53Sc is inserted through the outer surface of the cam barrel 53 into the threaded hole 532. The stopper screw 53Sc is so attached to the cam barrel 53 that the stopper screw 53Sc protrudes through the inner surface of the cam barrel 53. The cam barrel 53 has a defined rotation range because the stopper screw 53Sc comes into contact with the steps formed on both sides of the rotation restricting portion 526, which is formed in the guide barrel 52, in the circumferential direction.

Figure 7:
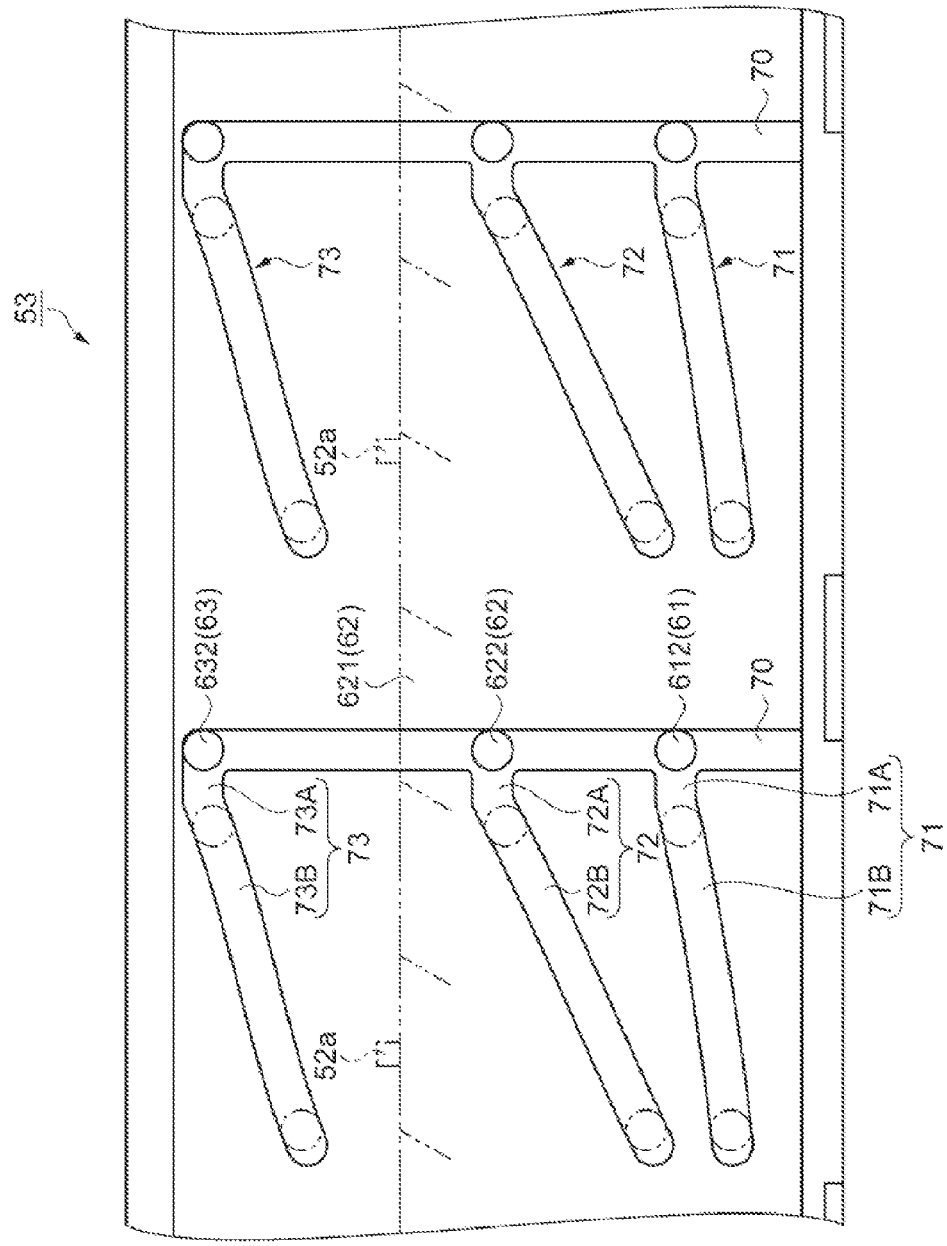
FIG. 7 is a development of a cam barrel in the embodiment when viewed from the interior thereof.

FIG. 7 is a development of the cam barrel 53 when viewed from the interior thereof, and part of the cam barrel 53 is omitted in FIG. 7.

On the inner surface of the cam barrel 53 are provided three sets of a guide groove 70, the cross section of which has a concave shape, and the cam grooves 71, 72, and 73, which are sequentially formed from the upstream side, and the three sets are disposed in the circumferential direction around the optical axis 5C at equal angular intervals of 120°, as shown in FIGS. 4 and 7 (FIG. 7 shows two of the three sets). Each of the guide grooves 70 and the cam grooves 71, 72, and 73 has a cross-sectional shape with which the front ends of the cam pins 612, 622, and 632 engage.

The guide grooves 70 are linearly formed from the upstream-side end of the cam barrel 53 along the optical axis 5C, and the cam pins 612, 622, and 632 of the lens frames 61, 62, and 63, which are inserted through the upstream-side opening 52A of the guide barrel 52, engage with the guide grooves 70. The guide grooves 70 then guide the cam pins 612, 622, and 632 to the cam grooves 71, 72, and 73, respectively.

The cam grooves 71, 72, and 73 are so formed that they are connected to the guide grooves 70, and the cam pins 612, 622, and 632, which have been guided through the guide grooves 70, engage with the cam grooves 71, 72, and 73 and define the movement of the lens frames 61, 62, and 63 along the optical axis 5C.

The cam grooves 71, 72, and 73 have introducing portions 71A, 72A, and 73A and movement defining portions 71B, 72B, and 73B, respectively, as shown in FIG. 7.

The introducing portions 71A, 72A, and 73A extend in a direction substantially perpendicular to the guide grooves 70. The introducing portions 71A and 72A extend from points somewhere in the middle of each of the guide grooves 70, and the introducing portion 73A is connected to the termination end of each of the guide grooves 70. The introducing portions 71A, 72A, and 73A are so formed that they locate the lens frames 61, 62, and 63 in positions on the side where the downstream-side opening 52B is present, that is, on a wide-end side where the lens frames 61, 62, and 63 are located in most retracted positions in the projection lens 5.

The movement defining portions 71B, 72B, and 73B are so formed that they are seamlessly connected to the introducing portions 71A, 72A, and 73A, respectively, and they move the lens frames 61, 62, and 63 forward with distance from the introducing portions 71A, 72A, and 73A.

The movement defining portions 71B, 72B, and 73B are so formed that they can continuously move the lens frames 61, 62, and 63 from the wide end to a telescopic end where the lens frames 61, 62, and 63 are located in most extended positions in the projection lens 5.

As described above, the telescopic end of the cam grooves 71, 72, and 73 is located on the side where the upstream-side opening 52A (first opening) is present, and the wide end and the introducing portions 71A, 72A, and 73A of the cam grooves 71, 72, and 73 are located on the side where the downstream-side opening 52B (second opening) is present. In each of the cam grooves 71, 72, and 73, the telescopic end, which is one end, corresponds to a first end, and the other end or the end of the corresponding one of the introducing portions 71A, 72A, and 73A, which are connected to the guide grooves 70, corresponds to a second end.

The cam grooves 71, 72, and 73 are so formed that the wide-end-side ends thereof are connected to each of the guide grooves 70, and the lens frames 61, 62, and 63, when inserted into the guide barrel 52 having been fit and inserted into the cam barrel 53, are located in the positions at the wide end.

When the cam barrel 53 is rotated, the cam pins 612, 622, and 632 having been guided through guide grooves 70 engage with the cam grooves 71, 72, and 73, respectively. Specifically, the cam pins 612 engage with the cam grooves 71, and the cam pins 622 engage with the cam grooves 72. The cam pins 632 engage with the cam grooves 73.

When the cam barrel 53 is further rotated, the lens frames 61, 62, and 63, the cam pins 612, 622, and 632 of which engage with the cam grooves 71, 72, and 73, respectively, are moved along the optical axis 5C because the cam pins 612, 622, and 632 are guided through the linear grooves 523 and the cam grooves 71, 72, and 73.

A zoom ring (not shown) is attached to the cam barrel 53, and the cam barrel 53 is rotated around the optical axis 5C relative to the guide barrel 52 when the zoom ring is rotated. When the zoom ring is rotated, the projection lens 5 changes the size of a projected image because the second lens group 502, the third lens group 503, and the fourth lens group 504, which are held by the lens frames 61, 62, and 63, are moved within the range from the wide end to the telescopic end. The movement defining portions 71B, 72B, and 73B in the present embodiment are so set that rotating the cam barrel 53 clockwise around the optical axis 5C when viewed from the upstream side of the projection lens 5 moves the lens frames in the direction from the wide end side toward the telescopic end side.

A method for manufacturing the projection lens 5 according to the present embodiment will be described.

The small cylindrical portion 522 of the guide barrel 52 is first fit and inserted into the cam barrel 53. Specifically, the cam barrel 53 and the guide barrel 52 are so aligned with each other in the circumferential direction that the upstream-side protruding portions 531 of the cam barrel 53 pass through the spaces between the locking portions 525 of the guide barrel 52, and the small cylindrical portion 522 of the guide barrel 52 is inserted into the cam barrel 53 through the upstream side thereof, as shown in FIG. 4. The small cylindrical portion 522 is then fit and inserted into the cam barrel 53 until the upstream-side protruding portions 531 come into contact with the large cylindrical portion 521.

The fixed frame 51 that holds the fifth lens group 504 is then fixed to the guide barrel 52 with a screw.

The guide grooves 70 of the cam barrel 53 are then aligned with the linear grooves 523 of the guide barrel 52 in the circumferential direction. That is, the guide barrel 52 or the cam barrel 53 is so rotated that the guide grooves 70 are visible through the linear grooves 523 to align the guide barrel 52 and the cam barrel 53 with each other in the circumferential direction.

The lens frame 63 that holds the fourth lens group 504 is then so inserted into the guide barrel 52 through the upstream-side opening 52A that the cam pins 632 engage with the linear grooves 523 and the guide grooves 70. The lens frame 63 is then moved toward the downstream side until the cam pins 632 come into contact with the termination ends of the guide grooves 70, as shown in FIG. 7. Since the termination ends of the guide grooves 70 are connected to the introducing portions 73A, the cam pins 632 are now positioned at the ends of the introducing portions 73A (second end), that is, the ends of the cam grooves 73.

Similarly, the lens frame 62 that holds the third lens group 503 is inserted into the guide barrel 52 through the upstream-side opening 52A, and the lens frame 62 is then moved toward the downstream side until the holding portion 621 comes into contact with the protrusions 52a of the guide barrel 52, as shown in FIG. 7. Since the protrusions 52a are so set that the lens frame 62 is positioned in a predetermined position in the guide barrel 52 when the holding portion 621 comes into contact with the protrusions 52a as described above, the cam pins 622 are positioned at the ends of the introducing portions 72A (second end), that is, the ends of the cam grooves 72, as shown in FIG. 7. As described above, when the lens frame 62 comes into contact with the protrusions 52a, the cam pins 622 are positioned at the ends of the introducing portions 72A (second end).

Similarly, the lens frame 61 that holds the second lens group 502 is inserted into the guide barrel 52 through the upstream-side opening 52A, and the lens frame 61 is moved toward the downstream side until the engaging portions 611*a* come into contact with the stepped portions 52*b* of the guide barrel 52. Since the stepped portions 52*b* are so set that the lens frame 61 is positioned in a predetermined position in the guide barrel 52 when the engaging portions 611*a* come into contact with the stepped portions 52*b* as described above, the cam pins 612 are positioned at the ends of the introducing portions 71A (second end), that is, the ends of the cam grooves 71, as shown in FIG. 7.

As described above, the lens frames 63, 62, and 61, which are sequentially inserted into the guide barrel 52, are disposed in predetermined positions in the guide barrel 52 where downstream movement of the lens frames 63, 62, and 61 are restricted at the termination ends of the guide grooves 70, the protrusions 52*a*, and the stepped portions 52*b*, respectively.

The cam barrel 53 is then rotated clockwise relative to the guide barrel 52 when viewed from the upstream side to move the cam pins 612, 622, and 632 positioned at the second end of the cam grooves 71, 72, and 73 from the guide grooves 70 to the cam grooves 71, 72, and 73. The stopper screw 53Sc is then attached to the cam barrel 53. A front end portion of the stopper screw 53Sc attached to the cam barrel 53 protrudes through the inner surface of the cam barrel 53, is placed in the rotation restricting portion 526 of the guide barrel 52, and defines the rotation range of the cam barrel 53. Further, the cam barrel 53, the upstream-side protruding portions 531 of which are locked by the locking portions 525 of the guide barrel 52, does not disengage from the guide barrel 52 within the defined rotation range.

When the cam barrel 53 is rotated, the lens frame 62 that has come into contact with the protrusions 52*a* with the cam pins 622 positioned at the ends of the introducing portions 72A (second end) is moved from the second end toward the first end (telescopic end), that is, in the direction in which the lens frame 62 moves away from the protrusions 52*a* along the optical axis 5C.

After the focus barrel 54 is attached to the guide barrel 52 through engagement, the stopper screw 52Sc is attached to the guide barrel 52. The projection lens 5 is thus manufactured.

As described above, the present embodiment can provide the following advantageous effect.

(1) The protrusions 52*a*, which come into contact with the lens frame 62 so that the cam pins 622 are positioned at the ends of the cam grooves 72, are provided on the inner surface of the guide barrel 52. In this configuration, after the lens frame 62 is moved until it comes into contact with the protrusions 52*a*, rotating the cam barrel 53 readily allows the cam pins 622 to engage with the cam grooves 72.

The cam pins 622 can therefore be positioned at the ends of the cam grooves 72 without increasing the thickness of each of the lens frames 62 and 63 in such a way that the cam pins 622 are positioned at the ends of the cam grooves 72 when the lens frames 62 and 63 are stacked on each other or without supporting the lens frame 62 with a jig, whereby a projection lens 5 that is readily manufactured with reduction in the size and weight of each of the lens frames 62 and 63 can be provided. The projection lens 5 can therefore be readily manufactured with reduction in the size and weight of each of the lens frames 62 and 63 and hence the size and weight of the projection lens 5. Further, since it is unnecessary to add a shape that allows the lens frames 62 and 63 to be stacked on each other or a shape that is supported by a jig to the lens frames 62 and 63, whereby the shape of each of the lens frames 62 and 63 can be simplified and the structure and shape of a die used to manufacture each of the lens frames 62 and 63 can be simplified.

(2) Since the lens frame 63, which is disposed in a position closer to the downstream-side opening 52B than the lens frame 62, the movement of which is restricted by the protrusions 52*a*, has the cutouts 63*n*, the lens frame 63 can be disposed in a predetermined position in the guide barrel 52, in which the protrusions 52*a* are formed, without coming into contact with the protrusions 52*a*.

(3) The lens frame 62, which is inserted into the guide barrel 5 through the upstream-side opening 52A, comes into contact with the protrusions 52*a*, and the cam pins 622 are therefore positioned at the ends of the introducing portions 72A (second end of each cam groove 72). When the cam barrel 53 is rotated in the state in which the lens frame 62 is in contact with the protrusions 52*a*, the lens frame 62 is moved along the optical axis 5C in the direction away from the protrusions 52*a*.

As compared with a configuration in which the lens frame inserted into the guide barrel 52 through the upstream-side opening 52A comes into contact with the protrusions so that the cam pins of the lens frame are positioned at the telescopic end (first end) of the cam grooves 71, the configuration of the present embodiment described above can simplify the shapes of the lens frame and the protrusions. That is, in the configuration in which the lens frame comes into contact the protrusions so that the cam pins are positioned at the first end of each cam groove, in order to move the lens frame from the first end to the second end, the lens frame and the protrusions need to be so configured that the lens frame is movable to the opposite side of the protrusions, which complicates the structure of the projection lens and the shape of each of the lens frame and the protrusions.

On the other hand, the configuration according to the present embodiment requires no structure that allows the lens frame 62 to move to the opposite side of the protrusions 52*a* (side behind protrusions), whereby not only can the structure of the projection lens 5 and the shape of each of the lens frame 62 and the guide barrel 52 be simplified but also the structure and shape of a die used to manufacture each of the members described above can be simplified.

(4) The lens frame 61 as the last lens frame has the engaging portions 611*a*, and the small cylindrical portion 522 has the stepped portions 52*b* provided in an edge portion thereof facing the upstream-side opening 52A. In this case, the stepped portions 52*b* formed in the small cylindrical portion 522 still ensures the strength of the small cylindrical portion 522, and the cam pins 612 of the lens frame 61 can be positioned at the ends of the cam grooves 71 without providing the guide barrel 52 with protrusions that restrict the movement of the lens frame 61 or increasing the thickness of the lens frame 61 along the optical axis 5C or the thickness thereof in the direction perpendicular to the optical axis 5C.

(5) The projection lens 5 includes not only the second lens group 502 to the fourth lens group 504, which are movable along the optical axis 5C, but also the first lens group 501 (focus lens group) and the fifth lens group 505 (fixed lens group). The projection lens 5 can therefore not only be compact and lightweight but also perform aberration compensation, zoom adjustment, focus adjustment, and other functions.

(6) Since the projector 1 includes the projection lens 5, the projector 1 can be not only compact and lightweight but also capable of projection of an image of satisfactory image quality and zoom and focus adjustment of the projected image.

Variations

The embodiment described above may be changed as follows.

The projection lens 5 according to the embodiment described above includes three lens groups that move in the guide barrel 52 (second lens group 502 to fourth lens group 504) but does not necessarily include three movable lens groups and may instead include two movable lens groups or four or more movable lens groups. In this case, to position the cam pins of at least one of the plurality of lens frames that hold the lens groups at the ends of the corresponding cam grooves, the guide barrel 52 may be provided with protrusions that come into contact with the at least one lens frame.

The lens frame 61 in the embodiment described above is so configured that the cam pins 612 are positioned in predetermined positions when the engaging portions 611a engage with the stepped portions 52b of the guide barrel 52. Instead, the engaging portions 611a and the stepped portions 52b may be omitted, and protrusions with which the holding portion 611 comes into contact may be provided on the inner surface of the guide barrel 52 so that the cam pins 612 are positioned in the predetermined positions. In this configuration, the lens frames 62 and 63 are provided with cutouts that prevent the protrusions from obstructing the lens frames 62 and 63.

In the projection lens 5 according to the embodiment described above, the upstream-side opening 52A is the first opening and the downstream-side opening 52B is the second opening, but the upstream-side opening 52A may be the second opening and the downstream-side opening 52B may be the first opening. That is, the plurality of lens frames may be inserted into the guide barrel 52 through the opening facing away from the side where the first lens group 501 (focus lens group) is disposed. In this configuration, the protrusions provided in the guide barrel 52 are so formed that the protrusions come into contact with the upstream side of one of the lens frames, and the cam barrel 53 is so formed that the guide grooves are connected to the telescopic end of the cam grooves. Further, the second end of each of the cam grooves is the telescopic end, and the first end of each of the cam grooves is the wide end.

The stepped portions 52b in the embodiment described above are formed in the inner surface of the small cylindrical portion 522, but the step formed by the large cylindrical portion 521 and the small cylindrical portion 522 may instead be used. That is, the lens frame 61 may be provided with engaging portions that engage with the step, so that the cam pins 612 may be positioned at the ends of the introducing portions 71A (second end) when the engaging portions engage with the step.

The projection lens 5 in the form of the lens barrel according to the embodiment described above can be used not only in the projector 1 but also in a camera, a telescope, and other optical apparatus.

The projector 1 according to the embodiment described above uses a transmissive liquid crystal panel as each of the light modulators but may instead use a reflective liquid crystal panel. A micromirror-type light modulator, such as a DMD (digital micromirror device), may still instead be used as each of the light modulators.

The light modulators in the embodiment described above are driven based on what is called a three-panel method using three light modulators corresponding to the R light, G light, and B light. The light modulators are not necessarily driven based on the three-panel method and may instead be driven based on a single-panel method, or the invention is also applicable to a projector including two light modulators or four or more light modulators.

The light source apparatus 31 does not necessarily use a discharge-type lamp and may instead be formed of a lamp based on any other light emission method or a light emitting diode, a laser, or any other solid-state light source.

The entire disclosure of Japanese Patent Application No. 2013-099072, filed May 9, 2013 is expressly incorporated by reference herein.

What is claimed is:

1. A lens barrel comprising:
a plurality of lens groups;
a plurality of lens frames that hold the respective plurality of lens groups and each have a cam pin that protrudes in a direction perpendicular to an optical axis of the plurality of lens groups;
a guide barrel that has a first opening, a second opening, and a linear groove which extends along the optical axis and through which the cam pins are inserted, the plurality of lens frames sequentially fit and inserted into the guide barrel through the first opening; and
a cam barrel into which the guide barrel is fit and inserted and which has cam grooves with which the cam pins protruding through the linear groove engage, the linear groove and the cam grooves guiding the cam pins when the cam barrel is rotated around the optical axis relative to the guide barrel to move the plurality of lens groups along the linear groove,
wherein
a protrusion is provided on an inner surface of the guide barrel, the protrusion coming into contact with at least one of the plurality of lens frames and restricting movement of the lens frame toward the second opening so that the cam pin of the lens frame is positioned at an end of the corresponding cam groove, and
the lens frame disposed in a position closer to the second opening than the lens frame that comes into contact with the protrusion has a cutout that prevents the protrusion from obstructing the lens frame disposed in the position closer to the second opening.

2. The lens barrel according to claim 1,
wherein each of the cam grooves has a first end located on the side where the first opening is present and a second end located on the side where the second opening is present, and
when the lens frame that is intended to come into contact with the protrusion comes into contact with the protrusion, the cam pin of the lens frame is positioned at the second end.

3. The lens barrel according to claim 1,
wherein among the plurality of lens frames, a last lens frame that is fit and inserted into the guide barrel after the other lens frames has an engaging portion that protrudes by an amount smaller than the amount of protrusion of the cam pin,
in the inner surface of the guide barrel is formed a stepped portion that engages with the engaging portion of the last lens frame fit and inserted through the first opening to restrict movement of the last lens frame toward the second opening, and
the stepped portion and the engaging portion are so formed that the cam pin of the last lens frame is positioned at an end of the corresponding cam groove.

4. The lens barrel according to claim 1, further comprising:
a focus barrel rotatably supported at the first opening of the guide barrel;
a focus lens group held by the focus barrel;
a fixed frame fixed at the second opening of the guide barrel; and
a fixed lens group held by the fixed frame.

5. A projector comprising:
a light source;
a light modulator that modulates light emitted from the light source in accordance with image information; and
the lens barrel according to claim 1 that projects the light modulated by the light modulator.

6. A projector comprising:
a light source;
a light modulator that modulates light emitted from the light source in accordance with image information; and
the lens barrel according to claim 2 that projects the light modulated by the light modulator.

7. A projector comprising:
a light source;
a light modulator that modulates light emitted from the light source in accordance with image information; and
the lens barrel according to claim 3 that projects the light modulated by the light modulator.

8. A projector comprising:
a light source;
a light modulator that modulates light emitted from the light source in accordance with image information; and
the lens barrel according to claim 4 that projects the light modulated by the light modulator.

9. A lens barrel comprising:
a plurality of lens groups;
a plurality of lens frames that hold the respective plurality of lens groups and each have a cam pin that protrudes in a direction perpendicular to an optical axis of the plurality of lens groups;
a guide barrel that has a first opening, a second opening, and a linear groove which extends along the optical axis and through which the cam pins are inserted, the plurality of lens frames sequentially fit and inserted into the guide barrel through the first opening; and
a cam barrel into which the guide barrel is fit and inserted and which has cam grooves with which the cam pins protruding through the linear groove engage, the linear groove and the cam grooves guiding the cam pins when the cam barrel is rotated around the optical axis relative to the guide barrel to move the plurality of lens groups along the linear groove,
wherein
a protrusion is provided on an inner surface of the guide barrel, the protrusion coming into contact with at least one of the plurality of lens frames and restricting movement of the lens frame toward the second opening so that the cam pin of the lens frame is positioned at an end of the corresponding cam groove,
each of the cam grooves has a first end located on the side where the first opening is present and a second end located on the side where the second opening is present, and
when the lens frame that is intended to come into contact with the protrusion comes into contact with the protrusion, the cam pin of the lens frame is positioned at the second end.

10. A lens barrel comprising:
a plurality of lens groups;
a plurality of lens frames that hold the respective plurality of lens groups and each have a cam pin that protrudes in a direction perpendicular to an optical axis of the plurality of lens groups;
a guide barrel that has a first opening, a second opening, and a linear groove which extends along the optical axis and through which the cam pins are inserted, the plurality of lens frames sequentially fit and inserted into the guide barrel through the first opening; and
a cam barrel into which the guide barrel is fit and inserted and which has cam grooves with which the cam pins protruding through the linear groove engage, the linear groove and the cam grooves guiding the cam pins when the cam barrel is rotated around the optical axis relative to the guide barrel to move the plurality of lens groups along the linear groove,
wherein
a protrusion is provided on an inner surface of the guide barrel, the protrusion coming into contact with at least one of the plurality of lens frames and restricting movement of the lens frame toward the second opening so that the cam pin of the lens frame is positioned at an end of the corresponding cam groove,
among the plurality of lens frames, a last lens frame that is fit and inserted into the guide barrel after the other lens frames has an engaging portion that protrudes by an amount smaller than the amount of protrusion of the cam pin,
in the inner surface of the guide barrel is formed a stepped portion that engages with the engaging portion of the last lens frame fit and inserted through the first opening to restrict movement of the last lens frame toward the second opening, and
the stepped portion and the engaging portion are so formed that the cam pin of the last lens frame is positioned at an end of the corresponding cam groove.

\* \* \* \* \*